Figure 1:
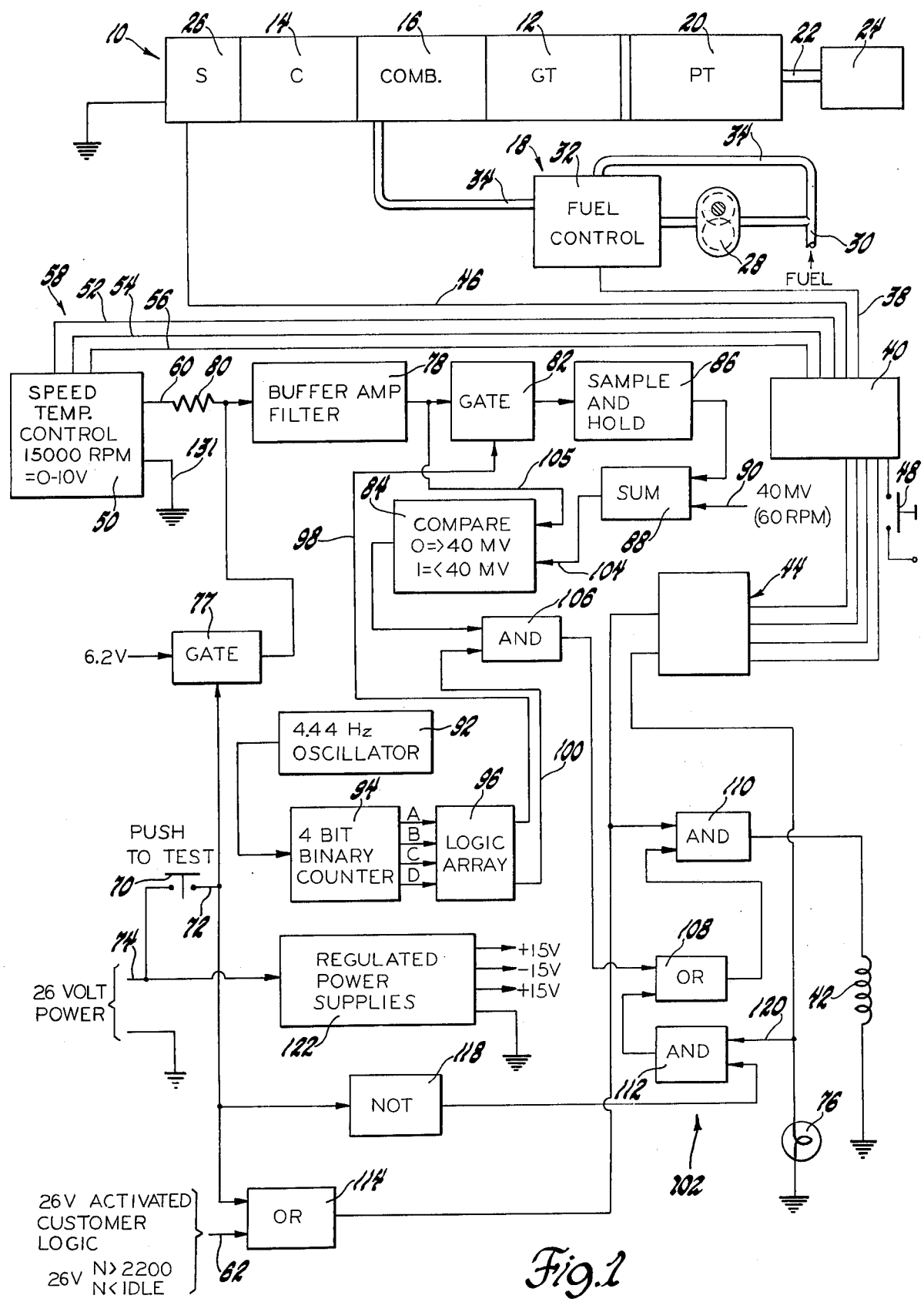

United States Patent [19]

Nelson et al.

[11] 4,044,551

[45] Aug. 30, 1977

[54] STAGNATION SENSING CONTROL

[75] Inventors: Robert E. Nelson, Indianapolis; Keith A. Pieper, Brownsburg, both of Ind.

[73] Assignee: General Motors Corporation, Detroit, Mich.

[21] Appl. No.: 681,782

[22] Filed: Apr. 30, 1976

[51] Int. Cl.² ............................................... F02C 7/26
[52] U.S. Cl. .................................................. 60/39.14
[58] Field of Search ......... 60/39.14, 39.09 R, 39.28 R

[56] References Cited

U.S. PATENT DOCUMENTS

| | | | |
|---|---|---|---|
| 3,470,691 | 10/1969 | Smith | 60/39.14 |
| 3,691,759 | 9/1972 | Scheerer | 60/39.09 |
| 3,793,826 | 2/1974 | Holleboom et al. | 60/39.14 |

Primary Examiner—Carlton R. Croyle
Assistant Examiner—L. T. Casaregola
Attorney, Agent, or Firm—J. C. Evans

[57] ABSTRACT

A stagnation sensing control for determining when a gas turbine engine has stagnated during a start phase of operation includes means for sampling the engine speed at a first predetermined point in time and means to hold the sampled speed in memory and further including means operative following a period of time to compare engine speed at the later point in time with the speed in memory and means operative if the speed increase is less than an established amount greater than the sampled speed in memory to produce an engine shutdown signal to operate engine starter and shut down circuits for terminating engine operation.

5 Claims, 2 Drawing Figures

STAGNATION SENSING CONTROL

This invention relates to turbine engine control systems and more particularly to turbine engine controls for sensing engine stagnation during a start phase of operation and operative to terminate engine operation when the engine speed increase in lower than a desired rate of engine speed increase subsequent to initiation of an engine start cycle of operation.

In gas turbine engines of the type having a turbine driven compressor for supplying air to a combustor in which fuel is mixed with the air and ignited to produce motive fluid for the turbine, a normal start phase of operation is characterized by a desired rate of speed increase of the engine compressor following operation of the engine starter. If ignition has occurred the engine compressor will have a speed increase produced by the turbine as combustion products from the combustor drive the drive turbine for the compressor. During normal start of the gas turbine engine, the speed of the engine will continually increase at a rate greater than a predetermined minimal value until fuel governing occurs. When the rate of speed increase of the engine is less than the desired minimal value the engine minimal value the engine starter drive plus engine assist drive by the engine turbine is not adequate to boost the engine to operating speed.

For example, under a normal start cycle of operation the engine starter is energized to take the engine into a speed range in the order of 2800-4000 rpm. At this point, the air load on the compressor is increased. At approximately 2200 rpm engine speed during a normal start sequence the igniters are turned on and fuel and air are burned in the combustor to produce power transfer from the drive turbine to the compressor. A temperature rise indicating combustion occurs about 2400-3000 rpm depending upon the fuel type and the fuel schedule. Under these circumstances the engine speed will continually increase at a desired rate until fuel governing occurs. If the engine starter and engine assist are adequate the engine speed increase will be greater than a minimal value. If the starter system is defective (weak); or if the fuel control schedule is insufficient at low speeds; or if there is a defective engine component; the combination of starter drive and engine assist is unable to drive the engine speed to a selected level of operating speed. Such a condition represents engine stagnation wherein there is insufficient air flow to cool turbine blades. Hence the engine must be shut down.

In the past it has been proposed to take a continuous derivative of the speed signal from the engine compressor during its start phase to determine rate of speed increase. However, during an initial time period of the start phase of operation, the rate of speed increase is relatively slight, for example, in the range of 20 rpm per second. Under these conditions the use of a continuous derivative of the speed signal to terminate start operations does not necessarily accurately reflect whether or not the start phase of operations is proceeding on schedule or whether engine speed is actuating because of too little starter drive and/or engine assist drive.

Accordingly, an object of the present invention is to improve control of a gas turbine engine during a start phase of operation by the provision of improved stagnation sensing means including means operative to sense the engine speed at a first point in time and means to maintain a reference value of the first sensed speed signal with a summed additional increment of speed increase; and by the further provision of comparator means operative to compare the initial reference signal with a second sensed signal of actual engine speed to determine whether the second sensed speed signal represents an engine speed reflecting a proper start sequence and by further means operative in response to failure to obtain a desired speed increase between the reference value and the later measured speed to terminate the start sequence of operation.

Still another object of the present invention is to provide an improved stagnation sensing control for use with a gas turbine engine to detect engine stagnation and to terminate a start phase of engine operation including a rate comparison circuit and a logic timer operative to cause the rate comparison circuit to establish a first predetermined speed signal and to add a fixed increment control signal to the first speed signal to produce a reference signal of desired speed increase, and to further control the rate comparison circuit to maintain the reference signal for a predetermined time delay period and thereafter to compare the reference signal with engine speed at a later point in time and wherein means are further provided to maintain engine operation in response to a desired comparison of the reference signal to the later spent speed signal and further operative in the event that the engine speed is less than a desired rate of increase to terminate the start phase of operation.

Yet another object of the present invention is to provide an improved means for sensing turbine engine speed stagnation when there is inadequate starter drive and/or engine assist drive during a start phase of engine operation by the provision of means for sensing the speed of the engine at first and second points in time and comparing the speed to establish whether a desired speed increase has occurred during the pedetermined time period and to further include means responsive to the occurrence of a desired speed difference to maintain the start phase of operation and to terminate the start phase of operation in the event that the desired speed increase between the first and second speed is less than a desired predetermined speed change which represents conditions of turbine engine speed stagnation.

Further objects and advantages of the present invention will be apparent from the following description, reference being had to the accompanying drawings wherein a preferred embodiment of the present invention is clearly shown.

Figure 2:
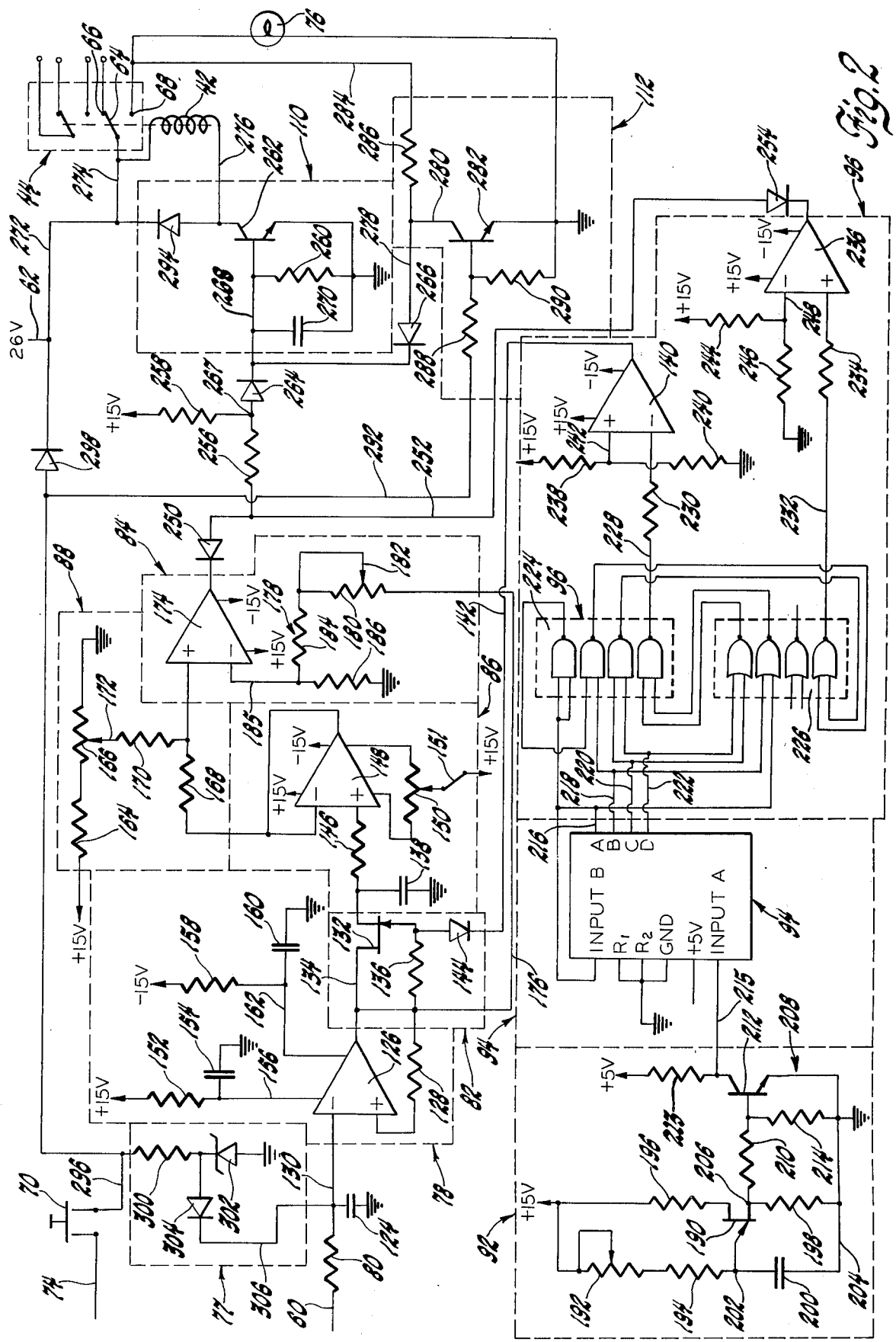

FIG. 1 is a diagrammatic view of a turbine engine including the present invention; and FIG. 2 is an electrical circuit diagram of the stagnation sensing controller of the present invention.

Referring now to FIG. 1, a gas turbine engine 10 is illustrated of the type including a gasifier turbine 12 that drives a compressor 14 for supplying air to a combustor 16 having a fuel supply 18 thereto. A free power turbine stage 20 drives a shaft 22 coupled to a load 24.

The engine 10 has a diagrammatically illustrated starter 26 that is operatively coupled to the compressor 14 for accelerating it during a phase of operation. During the start phase of operation a pump 28 of the fuel supply 18 is driven to direct fuel from an inlet 30 to a fuel control 32 having an outlet 34 therefrom connected to fuel nozzles within the combustor 16. The fuel supply 18 includes a bypass 34 from the discharge of the pump 28 back to the fuel supply to return excess pump discharge to the pump inlet.

Fuel control 32 is of the type which operate to meter fuel in response to the magnitude of an electrical signal. An example of such a control is set forth in U.S. Pat. No. 3,732,039 issued May 8, 1973, to Carothers. The fuel control 32 includes a fuel shutdown solenoid that receives a signal from line 38 from engine starter and shutdown circuits 40. In the illustrated arrangement the starter and shutdown circuits 40 are under the control of a relay having a solenoid coil 42 and relay switch 44. The circuits 40 are connected by a conductor 46 to an energization circuit for the starter 26 and the circuis are energized under the control of a start switch 48.

In the illustrated arrangement a speed and temperature control 50 has a plurality of output lines 52, 54, 56 to operate the shutdown circuit portion circuits 40 during normal engine operation. These control functions form no part of the present invention and are merely representative of well known control systems for terminating engine operation during a run operation in response to conditions such as turbine engine inlet temperature and the speed of operation of either or both the gas turbine 12 or the power turbine 20.

During normal start of gas turbine engine 10 the start switch 48 is depressed to energize the circuits 40 and the starter 26. The speed of the compressor 14 will continually increase as long as engine stagnation does not occur. For purposes of the present invention, engine speed stagnation occurs on start when any one or all of the following conditions exist:

1. Low starter power or a defective starter problem.
2. Improper fuel control scheduling at low speeds.
3. Defective engine operation caused by e.g.: nozzles, burner assemblies, seals, turbines, compressors.

The present invention is to an improved stagnation sensing control 58 in FIG. 1 operative to detect the aforesaid flattening of compressor speed increase. The control 58 is associated with the speed temperature control circuit 50 which directs a speed input in the form of a DC voltage proportional to engine speed through an input line 60. In one working embodiment the DC voltage signal reflecting engine speed is scaled from 0 to 10 volts for a speed range of from 0 to 15,000 rpm.

The control 58 includes a second input which is a 26 volt DC source connected to an input line 62 and which is maintained at 26 volts through a speed range during which the stagnation sensing control 58 is enabled. The shutdown output of the control 58 is represented by the relay switch 44 having a movable contact 64 connected to a closed contact 66 prior to sensing a stagnation condition. The movable contact 64 is shifted by the coil 42 into engagement with an open contact 68 after the control 58 senses a stagnation condition. See FIG. 2.

The control 58 further includes a push-to-test switch 70 connected to a third input line 72 to impose a simulated constant speed input to control 58, represented by a 26 volts DC power source 74. Once the first push-to-test switch 70 is depressed proper operation of the stagnation sensing circuit 58 is indicated by a light 76 which will come on for a short time every three seconds as long as the swich 70 is depressed. Switch 70 also directs a signal to gate 77 with a 6.12 volt input and an output to the amplifier filter 78 for reasons to be discussed.

In accordance with the present invention the stagnation sensing control 58 includes a sample and hold and a separate comparison function which is performed by a buffer amplifier filter circuit 78 having an input thereto from the input line 60 through a resistor 80. The output from the buffer amplifier filter circuit 78 is fed to a gate 82 and to a comparator 84. An output from the gate circuit 82 is connected to a sample and hold circuit 86 with an output to a sum circuit 88. Circuit 88 has a fixed speed increase input signal of 40 millivolts representing a 60 rpm signal through line 90.

Control timing of the gate 82 is produced by a 4.44 Hz oscillator 92 which controls an up counter 94 having its output connected to a logic array 96 with one output on line 98 to the gate 82 and a second output on line 100 to relay drive and latch logic circuitry 102.

Output signals from the sum block 88 and amplifier filter 78, lines 104, 105, respectively, are compared by comparator 84 to produce an output which is directed along with the signal on line 100 from logic array 96 to the logic circuitry 102.

Circuitry includes an AND block 106 with output connected to OR block 108 having a second input from AND block 112. The output of block 108 is one input of AND block 110. A second input to block 110 is from OR block 114.

OR block 114 has the 26 volt activated signal 62 imposed thereon during a speed range or turbine operation greater than 2200 and less than idle speed. The OR block 114 output signal is activated within the aforesaid speed range to place a 26 volt power source on a movable contact 64 and to direct an enabling input to the AND gate 110 which when combined with a stagnation condition output signal from the OR gate 108 will energize the coil 42 to initiate engine shut down.

Additionally, the control 58 includes a NOT block 118 that receives input from the push-to-test switch 70 to direct an input to the AND block 12 along with a second input from a line 120 and the energization circuit for the light 76. The line 120 is electrically connected to a normally open contact 68 which will be in contact with the movable contact 64 following a shutdown phase of operation. By summary, two inputs to AND block 106, one input to OR block 108 and two inputs to AND block 110 produce shutdown. This requires power to block 114 and an engine stagnation signal from block 106. For a more detailed explanation of the relay drive and latch logic 112 reference is made to the details of the circuit in FIG. 2.

For purpose of the schematic in FIG. 1, line 74 is connected to regulated power supply 122 for supplying power to circuit components in FIG. 2.

FIG. 2 circuit components are grouped and indentified with the block designations in FIG. 1 where common reference can be made. In some instances the block functions are performed by separate circuit components which will be mentioned in the following circuit description to FIG. 2.

The speed input signal from line 60 and resistor 80 is coupled to a capacitor 124 to provide input signal filtering and prevent noise from the gate 82 from being imposed through the line 60 to the speed temperature control 50. An operational amplifier 126 has a resistor 128 connected from its output circuit to the noninverting input terminal thereof. The operational amplifier 126 and resistance 128 are connected to form a voltage follower wherein the voltage at the output circuit of amplifier 126 will be equal to a speed input voltage which is connected to the inverting input of the operational amplifier 126 by means of conductor 130. A separate ground 131, FIG. 1, from the speed temperature control 50 is connected to establish a reference for the speed signal on the input line 60.

The function of gate 82 in the schematic of FIG. 1 is accomplished by a field effect transistor 132 connected to the output circuit of operational amplifier 126 by means of a conductor 134. The gate of the field effect transistor 132 is connected to the conductor 134 by a resistor 136. Addtionally, the gate 82 includes a capacitor 138 connected to the output of transistor 132 thence to ground. In the illustrated arrangement a gate control signal (line 98 in FIG. 1) is produced from the output circuit of an operational amplifier 140 which is connected by conductor 142 to diode 144 thence to the gate of the transistor 132. When the cathode of the diode is at a plus 14 volt saturation level the field effect transistor 132 is turned on and conducts the buffered speed signal from operational amplifier 126 to capacitor 138 causing it to be charged to the level of a buffered speed signal from the output circuit of amplifier 126. The aforesaid signal represents a first sample condition in the stagnation sensing control circuit operation.

When the cathode of the diode 144 is at a negative saturation level of 14 volts, the field effect transistor 132 is maintained nonconductive and the voltage on the capacitor 138 does not change appreciably from the stored, sampled voltage level maintained during a hold period to be discussed.

The sample and hold function of schematic block 86 is performed by a resistor 146 connected to the noninverting terminal of an operational amplifier 148 which has a resistor 150 connected thereacross to produce an offset adjustment for the operational amplifier so that the voltage output of the amplifier may be adjusted equal to the voltage on the capacitor 138. Resistor 150 is connected to a voltage source by movable contact 151.

In the illustrated arrangement the amplifier 148 is a FET input operational amplifier connected as a voltage follower. The amplifier 148 has a very high input impedance in the order of $10^{14}$ ohms and requires very little bias current in the order of approximately 5pA. Because of these characteristics, the sample voltage on the capacitor 138 will not change appreciably during a hold period of operation to be discussed.

The resistor 146 prevents damage to the input of the amplifier 148 when power is removed from the circuit while the capacitor 138 is charged. The buffer speed signal from the operational amplifier 126 is in part established by known filter components for the amplifier 126 including a resistor 152 connected to a closely regulated +15 volt power source and a capacitor 154 connected in parallel with resistor 152 and to ground and by means of a line 156 to the operational amplifier. Further filtering is provided by resistor 158 connected to a −15 volt power source and a capacitor 160 connected in parallel with the resistor 158 thence to ground and through a line 162 to the amplifier 126.

The sum function of block 88 in the schematic of FIG. 1 is produced by network of resistances 164, 166, 168 and 170 in the circuit of FIG. 2. The resistance 164 is connected to a +15 volt power source, thence through resistor 166 and movable contact arm 172. Arm 172 is connected through resistor 170 to the noninverting input of an operational amplifier 174. The network of resistances 164 through 170 produces a voltage equivalent of 60 rpm (approximately 40 millivolts) to the noninverting input terminal of amplifier 174. It also receives a sample speed signal from the operational amplifier 148.

The operational amplifier 174 also has a buffer speed signal from the operational amplifier 126 imposed thereon through line 176 connected from the output circuit of the operational amplifier 126 thence through a resistance network 178 including a resistance portion 180 of a potentiometer 182 in series connected through a resistor 184 thence through line 185 to the inverting terminal of operational amplifier 174. The network 178 further includes a resistor 186 connected from the line 185 to ground. The buffer speed signals on the conductor 176 are actual engine speed. These signals are attenuated by the network 178 and resistance 180 is adjustable so that the attenuation of the speed signal into both inputs of the operational amplifier 174 is equal. In the illustrated arrangement the operational amplifier 174 is connected as a comparator and represents the comparison function in block 84 of the schematic system.

The output from the operational amplifier 174 is at positive saturation when the voltage at the noninverting terminal thereof is greater than at the inverting terminal thereof. The output of the operational amplifier 174 will switch to negative saturation if the speed signal at the inverting terminal increases by a voltage difference which is equal to or greater than a 60 rpm in engine speed for another sample as taken. Conditioning of the output of the operational amplifier 174 to negative saturation will maintain the engine starting sequence by maintaining the shutdown relay 44 inoperative as will be discussed.

In the illustrated arrangement the sample voltage on the capacitor 138 is maintained during a hold period through timing logic including a 4.4 Hz oscillator 92 which is shown in FIG. 2 as including a unijunction transistor 190, resistors 192, 194, 196 and 198. Resistor 192 is variable for calibration purposes. A capacitor 200 is connected in series with resistor 194 to ground by line 204 and directs a signal from potential point 202 to the base of the unijunction transistor 190. The transistor 190, capacitor 200 and the resistors 192 through 198 are connected as a free running oscillator. The output of terminal point 206 of the unijunction transistor 190 is a series of pulses having approximately nine volts amplitude. This output is connected to an inverter stage 208 by a resistor 210 connected to the base of an NPN type transistor 212. The inverter stage 208 includes collector resistor 213 to a +5 V source. A resistor 214 is connected from the base to emitter of the NPN transistor 212 to ground. The transistor 212 is driven in response to the pulsed output of 9 volts from the unijunction transistor 190 to produce an outut of a series of pulses to a line 215 at an amplitude of 5 volts and a period of 0.225 seconds. Line 215 connects to the input of counter 94. The 5 volt pulse train causes the four bit binary counter 94 to continuously count up through 16 different output states.

In the illustrated ciruit, the counter 94 has four output lines 216, 218, 220 and 222, connected to logic array 96 in the schematic of FIG. 1. As shown in FIG. 2, the logic array 96 consists of standard TTL logic compounds 224, 226. NAND gates of the TTL logic 224 and the NOR gates of TTL logic 226 are connected to indicate when a count of 0000 is present and when a count of 1110 is present from counter 94. The output of NAND gates is connected through a line 228 thence through a resistor 230 to the inverting terminal of the operational amplifier 140 and the output from the NOR gates is connected through a line 232 thence through a resistor 234 to the noninverting terminal of an operational amplifier 236.

When a count of 0000 is present on the output lines of the counter 94 the output line 228 from the NAND gates is at a 0 volt level. This voltage is compared to a level of approximately 1 volt at the noninverting terminal of the operational amplifier 140 as produced by a voltage network including resistor 238 connected to a +15 volt power supply and a second resistor 240 connected to ground with both resistors 238, 240 supplying an input line 242 for imposing the 1 volt reference signal. Likewise the operational amplifier 236 includes a reference voltage on its inverting terminal of 1 volt as produced by resistor 244 connected to a 15 volt power supply and a second resistor 246 connected in parallel therewith to ground and through an input line 248 to the operational amplifier 236.

When the circuit 58 is operational, the oscillator 92 continuously pulses the counter 94 to cause it to count up through 16 different states including resultant counts of 0000 and 1110 on the output lines 216 through 222. When a count of four zeros is present, the zero voltage level produced at the inverting terminal of the operational amplifier 140 will cause its output to saturate positive, in one working embodiment +14 volts. As previously mentioned, this positive saturation voltage is placed on the cathode of the diode 144 to cause the transistor 132 to conduct to condition the sample hold circuit 86, namely the capacitor 138, in the sample voltage state. For all the other counts at the output of the counter 94 the output of the operational amplifier 140 will be maintained at a −14 volt saturation condition to turn off the transistor 132 to produce a hold condition in the operation of the circuit. In the illustrated circuit the hold period is maintained for 3 seconds during which time the engine speed signal on line 176 increases with respect to the sample signal held on capacitor 138. The three second hold period is the time required to go from a count of 000 to 1110 with an oscillator frequency of 4.44 Hz.

When a count of 1110 is present on the output lines of the counter 94 the voltage on the line 232 will be at approximately 5 volt level. This voltage is compared to the 1 volt reference voltage on the inverting input of the operational amplifier 236 to cause the output of the amplifier 236 to saturate to −14 volts. For all other counts of the counter 94 the operational amplifier 236 will have an output voltage at negative saturation of −14 volts.

A stagnation of the speed increase of the compressor 14, produced when the combination of starter drive and engine assist is unable to drive the engine speed to a selected level of operating speed, is detected by the circuit if the output of the comparator (line 105 in FIG. 1) represented by the operational amplifier 174 is at positive saturation of 14 volts when the counter has reached a count of 1110. In other words, engine saturation is detected if the speed signal on the line 176 does not increase 60 rpm or more during any three second test period of circuit operation.

The relay drive and latch logic functions of schematic circuit blocks 106, 108, 110, 112, 114 and 118 are utilized to direct an engine stagnation detection to the relay switch 44 to terminate the start phase.

The function of block 106 is performed by diodes 250, 254. Diode 250 has its cathode connected to the ouput of the operational amplifier 174 and its anode connected by line 252 to the anode of diode 254 which has its cathode connected to the output of the operational amplifier 236. If the cathode of both diodes 250, 254 are at positive saturation of approximately +14 volts, then a biased resistance network including resistor 256, 258 and 260 function to turn on an NPN transistor 262 to energize the relay coil 42 to operate the relay 44 to condition the customer shutdown circuits 44 to terminate the start phase of operation. This results, however, depends upon the presence of drive current through either diode 264 or 266 which performs the logic function of block 108.

In the illustrated arrangement the resistor 256 of the network is connected to line 252 and to a potential point 267 to receive a signal from a closely regulated +15 volt power source across the resistor 258. This signal is conducted through the diode 264 having its cathode connected by line 268 to the base of the transistor 262. The resistor 260 in parallel with a capacitor 270 both connected from line 268 to ground. Capacitor 270 across the base emitter of the NPN transistor 262 provides enough filtering so that noise pickup will not cause the relay coil 42 to come on and latch switch 44.

Hence when the cathodes of the diodes 250, 254 are at positive saturation a signal is directed to the base of the transistor 262 to maintain it conductive. An energization circuit from power source 62 is completed through input line 272 to one side 274 of the relay coil 42. The opposite side 276 of coil 42 is connected to the collector of the transistor 262. The emitter of transistor 262 is connected to ground.

The OR function of schematic block 108 is performed by diode 264 and diode 266 having its cathode connected to the line 268 and its anode connected by a line 278 to the collector terminal 280 of an NPN transistor 282. If there is sufficient drive current through the diode 264 (representing plus saturation at the cathode of both diodes 250, 254) or through the diode 266, transistor 262 will conduct.

The AND function of the block 110 in the schematic of FIG. 1 is performed by the fact that 26 volts must be present at input 62 to have circuit operation. Also, transistor 262 must be conductive before the coil 42 is energized. When both events are present, coil 42 is energized to mate circuits 64, 68. Then, 26 volt power is applied to a line 284 from contact 68. Line 284 connects to resistor 286 thence to the anode of diode 266.

If the transistor 282 is off, current flow through resistor 286 will latch on the relay circuit by maintaining a base current to the forwardly biased NPN transistor 262 so that it will remain conductive.

The AND block 112 function and the NOT block 118 function are performed by the transistor 282 and resistors 286, 288, 290 associated with the transistor 282. More particularly, the resistor 288 is connected to a push-to-test power supply to be described by a line 292 thence to the base of the transistor 282. The resistor 290 is connected from the base of the transistor 282 across the emitter thereof to ground. When 26 volt power from input 62 is applied to the resistor 286 as set forth above, and if the push-to-test switch 70 is not pushed (keeping transistor 282 off) then the relay circuit will latch. A diode 294 connected across the relay coil 42 has its cathode connected to line 272 and its anode connected to the collector of the transistor 262. It suppresses the turn-off transient of the coil 42 to protect the transistor 262.

In addition to the normal sample, hold and relay drive and latch logic drive operation of the circuit 58, there is a push-to-test mode wherein the push-to-test switch 70 is pushed so as to apply 26 volts to an input line 296 connected across a diode 298 to line 272. Line 292 to base of transistor 282 connects to the line 296 representing the push-to-test source.

When switch 70 is closed, current is directed to gate 77 which includes a resistor 300 and a zener diode 302 to ground. A zener established control voltage of 6.2 volts is applied to the inverting terminal of the operational amplifier 126 across a diode 304 and a line 306 to simulate a constant speed signal on the operational amplifier at the push-to-test mode. The constant speed represents an imposed stagnation condition signal which will be used to test the aforesaid circuitry to turn on the transistor 262 when a count of 1110 is imposed on the logic array 96 by the counter 94. The relay circuit will not latch on, however, because the 26 volt signal at the input line 296 and line 292 turn on the transistor 282. Current flow through transistor 282 prevents latch current from passing through the resistor 286 to the base of transistor 262. The push-to-test 76 is connected from contact 68 to ground. Accordingly, light 76 will be on for 0.2 seconds during the count of 1110 which momentarily closes contacts 64, 68 and off for the rest of the 3 second cycle.

The function of block 114 in the schematic of FIG. 1 is produced by diode 298. That is, if either 26 volt activated signal is present at line 62 or if the push test switch is closed, then the coil 42 has a 26 volt signal at contact 66 which will allow the relay to be energized when the transistor 262 turns on. The diode 298 prevents the 26 volt activated signal on line 62 from driving through the zener diode 302.

As pointed out in preceding material, the 26 volt activated signal is only operative in a range which it is desired to have a stagnation control of the starter and shut down circuits 40 for example, through a speed range from a speed greater than 2200 rpm to idle speed. This will produce an output signal from the OR function block 114 so as to place power on movable contact 64 which is normally closed against contact 66 to energize the starter and shut down circuits 40. At the same time block 114 represented by diode 298 directs a signal to AND function block 110 to latch the relay as discussed above.

Operational amplifiers 126, 140, 148, 174, 236 are devices having high input impedance, low output impedance, and high gain. They have a differential input such that, when the noninverting input potential is higher than that of the inverting input, the output is turned on; and, when the inverting input potential is higher than that of the noninverting input, the amplifier turns off. Thus, with feedback from the output to the inverting input, the output will follow the input to the noninverting input terminal.

In one working embodiment the circuits 58 had components with the following characteristics.

| COMPONENT | CHARACTERISTIC TYPE |
| --- | --- |
| Capacitor 124 | .1 MFD, 80V |
| Capacitors 154, 160, 200 | 1 MFD, 50V |
| Capacitor 138 | 5 MFD, 50V |
| Capacitor 270 | 22 MFD, 35V |
| Resistors 80, 128, 136, 170, 186, 192, 194 | 100 K ohms |
| Resistors 238, 244 | 15 K ohms |
| Resistors 146, 150, 164, 168, 198, 288 | 10 K ohms |
| Resistor 184 | 9.53 K ohms |
| Resistor 286 | 4.7 K ohms |
| Resistor 258 | 3.6 K ohms |
| Resistor 210 | 2 K ohms |
| Resistor 256, 300 | 2.7 K ohms |

-continued

| COMPONENT | CHARACTERISTIC TYPE |
| --- | --- |
| Resistors 166, 180, 214, 230, 234, 240, 246, 290 | 1 K ohm |
| Resistor 196 | 820 ohms |
| Resistor 260 | 390 ohms |
| Resistors 152, 158 | 20 ohms |
| Operational Amplifier 148 | SU 536 T (Signetics) |
| Counter 94 | SN 5493J (Texas Instruments) |
| Diodes 144, 304 | 1N 457 |
| Diodes 250, 254, 264, 266 | 1N 4148 |
| Diodes 294, 298 | 1N 4003 |
| Transistor 132 | 2N 4857 |
| Transistor 190 | 2N 4949 |
| Transistors 212, 282 | 2N 2222A |
| Transistor 262 | 2N 3019 |
| Zener Diode 302 | 1N 821 |
| Logic Element 224 | SN 5400J (Texas Instruments) |
| Logic Element 226 | SN 5402J (Texas Instruments) |

By use of the aforesaid circuit components as set forth in FIG. 2, precise indication of speed change is possible even though the speed curve of the compressor 14 is relatively flat during the start operation. The circuit eliminates premature shutdown as might be caused by use of devices for detecting a continuous derivative of speed change during initial start phases. Such devices may fail to indicate slight speed changes at the beginning of a proper start sequences and cause shutdown. The circuit of the present invention uses comparison of actual speed to a prior signal plus a fixed speed increase to detect stagnation and does not produce shutdown except for an actual engine stagnation.

While the embodiments of the present invention as herein disclosed constitute a preferred form, it is to be understood that other forms might be adopted.

The embodiments of the invention in which an exclusive property or privilege is claimed are defined as follows:

1. An engine speed stagnation control system for a gas turbine engine having a starter motor and fuel supply means under the control of rely switch means and wherein the gas turbine engine includes a combustor, compressor and power turbine; the control system comprising: means for sensing engine speed and producing an output signal directly in response thereto, means including signal responsive gate means to sample said output signal and to maintain a first control speed signal, means for adding a fixed increment control signal to said first control speed signal to produce a reference signal of desired speed increase, time delay means for controlling said gate means to maintain said reference signal for a perdetermined time delay period, signal generating means including comparator means for comparing said reference signal and said engine speed signal and operative following the predetermined time period to produce a relay control signal, and logic means responsive to said relay control signal for controlling starter energization and fuel supply to the combustor to maintain engine start when the engine speed has increased an amount equal to the desired speed increase during the elapsed time period established by said time delay means and to terminate engine start when the engine speed increase is below the desired speed increase.

2. A control circuit for a gas trubine engine to terminate an engine start of operation wherein fuel is directed to a turbine engine combustor and a gasifier turbine shaft is driven by a starter and wherein motive fluid is directed from the combustor across a turbine to operate an output shaft comprising: means for sensing the speed of the output shaft and producing a signal of engine speed, sampling means for holding a first engine speed signal, gate means for selectively connecting said signal of engine speed to said sampling means, timer means for controlling said gate means to maintain said first engine speed signal on said sampling means for a predetermined time delay period, means for adding a constant speed increase to said first engine speed signal to produce a desired reference speed of start operation, signal generating means including comparator means for comparing said desired reference speed with the actual engine speed signal and operative following the predetermined time delay period to produce an output signal switch means responsive to the signal generating means output to maintain the starter and fuel control supply energized during the engine start cycle so long as the actual engine speed following each time period is in excess of the desired reference speed signal, said switch means being responsive to the signal generating means output signal when the actual engine speed is less than a desired value following the predetermined time delay period to terminate energization of the starter and fuel control when engine stagnation conditions occur.

3. A control circuit for a gas turbine engine to terminate an engine start cycle of operation wherein fuel is directed to a turbine engine combustor and a gastifier turbine shaft is driven by a starter and wherein motive fluid is directed from the combustor across a power turbine to operate an output shaft comprising: means for sensing the speed of the output shaft and producing a signal of engine speed, sampling means for holding a first engine speed signal, gate for selectively connecting said signal of engine speed to aid sampling means, timer means for controlling said gate means to maintain said first engine speed signal on said sampling means for a predetermined time delay period, means for adding a constant speed increase to said first engine speed signal to produce a desired reference speed of start operation, said timer means including a free running oscillator and means to produce a pulse train, digital counter means responsive to said pulse train and having first and second output states produced following predetermined time delay periods, first amplifier means responsive to the first output state of control said gate means, comparator means for comparing said desired reference speed with the actual engine speed signal following the predetermined time period and including a comparator means output, second amplifier means responsive to said second output state to produce a signal combined with that of said comparator means to produce a switch control signal, switch means responsive to the switch control signal to maintain the starter and fuel control supply energized during the engine start cycle so long as the actual engine speed following each time delay period is in excess of the desired reference speed signal, said switch means being responsive to the switch control signal when the actual engine speed is less than a desired value following a predetermined time period to terminate energization of the starter and fuel control when engine stagnation conditions occur.

4. A control circuit for a gas turbine engine to terminate an engine start cycle of operation wherein fuel is directed to a turbine engine combustor and a gasifier turbine shaft is driven by a starter and wherein motive fluid is directed from the combustor across a power turbine to operate and output shaft comprising: means for sensing the speed of the output shaft and producing a signal of engine speed, means including gate means for producing a first predetermined desired reference speed during a predetermined time delay period, said timer means including a free running oscillator and means to produce a pulse train, digital counter means responsive to said pulse train and having first and second output states produced following predetermined time delay periods, first amplifier means responsive to the first output state to control said gate means, comparator means for comparing said reference speed with the actual engine speed signal following the predetermined delay period and including a comparator means output, second amplifier means responsive to said second output state to produce a signal combined with that of said comparator means to produce a switch control signal, switch means responsive to the switch control signal to maintain the starter and fuel control supply energized during the engine start cycle so long as the actual engine speed following each time delay period is in excess of the desired reference speed signal, said switch means being responsive to the switch control signal when the actual engine speed is less than a desired value following a predetermined time period to terminate energization of the starter and fuel control when engine stagnation conditions occur.

5. A control circuit for a gas turbine engine to terminate an engine start cycle of operation wherein fuel is directed to a turbine engine combustor and a gasifier turbine shaft is driven by a starter and wherein motive fluid is directed from the combustor across a turbine to operate an output shaft comprising: means for sensing engine speed and producing a signal of engine speed, summer means for adding a fixed speed increase to an actual engine speed to produce a series of desired reference speeds, means for maintaining said reference speeds during a series of time delay periods, signal generating means including comparator means for comparing each of said desired reference speeds with actual engine speed at the end of each time delay period, said comparator means being operative following the predetermined time period to produce an output signal, switch means responsive to the output signal to maintain the starter and fuel control supply energized during the engine start cycle so long as the actual engine speed at the end of each time delay period is in excess of the desired reference speed signal established at the beginning of each of the time delay periods, said switch means being responsive to the output signal from said signal generating means when the actual engine speed increase is less than desired during any of the predetermined time delay periods to terminate energization of the starter and fuel control when engine stagnation conditions occur.

* * * * *

UNITED STATES PATENT AND TRADEMARK OFFICE
CERTIFICATE OF CORRECTION

PATENT NO. : 4,044,551
DATED : August 30, 1977
INVENTOR(S) : Robert E. Nelson & Keith A. Pieper It is certified that error appears in the above-identified patent and that said Letters Patent are hereby corrected as shown below:

| Pat. Col. | Line | |
|---|---|---|
| 1 | 59 | "operations" should be -- operation -- |
| 1 | 60 | Cancel "Actuating" and substitute -- stagnating -- |
| 2 | 61 | after "during a", insert -- start -- |
| 3 | 11 | change "circuis" to -- circuits -- |
| 3 | 57 | change "volts" to -- volt -- |
| 3 | 62 | change "6.12" to -- 6.2 -- |
| 4 | 24 | after "2200" insert -- rpm -- |
| 4 | 33 | change "block 12" to -- block 112 -- |
| 4 | 45 | change "purpose" to -- purposes -- |
| 6 | 4 | change "connected" to -- connection -- |
| 6 | 15 | after "system" add -- in Figure 1. -- |
| 6 | 58-59 | change "com-pounds" to -- com-ponents -- |
| 7 | 37 | change "000" to -- 0000 -- |
| 7 | 44 | change "-14 volts" to -- +14 volts -- |

UNITED STATES PATENT AND TRADEMARK OFFICE
CERTIFICATE OF CORRECTION

PATENT NO. : 4,044,551
DATED : August 30, 1977
INVENTOR(S) : Robert E. Nelson & Keith A. Pieper It is certified that error appears in the above-identified patent and that said Letters Patent are hereby corrected as shown below:

| Pat. Col. | Line | |
|---|---|---|
| 7 | 55-56 | change "saturation" to -- stagnation -- |
| 8 | 6 | change "results" to -- result -- |
| 8 | 16 | after "resistor 260" insert -- is -- |
| 9 | 19 | after "push-to-test" insert -- light -- |
| 9 | 33 | after "range" insert -- during -- |

CLAIM 2

| 10 | 65 | after "start" insert -- cycle -- |
|---|---|---|

CLAIM 3

| 11 | 27 | change "gastifier" to -- gasifier -- |
|---|---|---|
| 11 | 33 | after "gate" insert -- means -- |
| 11 | 34 | change "aid sampling" to -- said sampling -- |
| 11 | 45 | change "state of" to -- state to -- |

UNITED STATES PATENT AND TRADEMARK OFFICE
CERTIFICATE OF CORRECTION

PATENT NO. : 4,044,551

DATED : August 30, 1977

INVENTOR(S) : Robert E. Nelson & Keith A. Pieper

It is certified that error appears in the above-identified patent and that said Letters Patent are hereby corrected as shown below:

Pat.
Col.  Line

CLAIM 4

| 12 | 6  | change "and output" to -- an output -- |
| 12 | 19 | before "delay" insert -- time -- |
| 12 | 29 | change "thana" to -- than a --. |

Signed and Sealed this

Twenty-fifth Day of April 1978

[SEAL]

Attest:

RUTH C. MASON
Attesting Officer

LUTRELLE F. PARKER
Acting Commissioner of Patents and Trademarks